Figure 1:
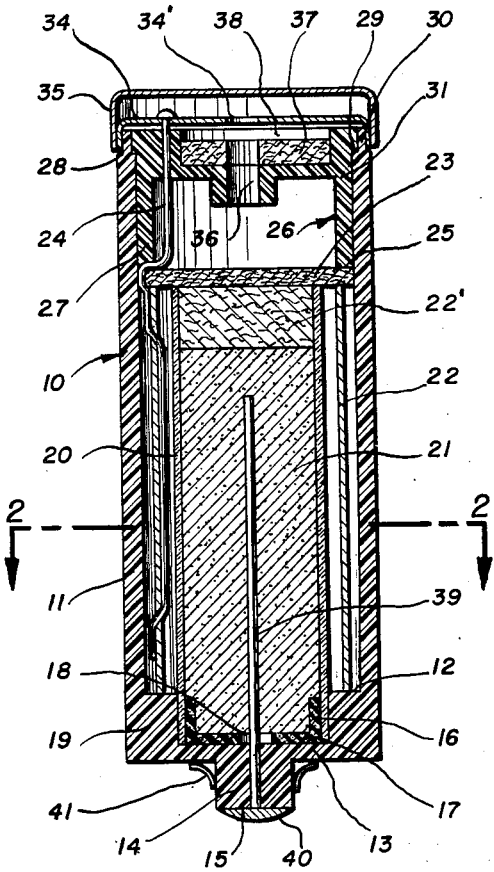

Sept. 23, 1952            H. G. ANDRÉ            2,611,792

METHOD OF MAKING ELECTRIC ACCUMULATORS

Filed April 26, 1950

INVENTOR:
HENRI GEORGES ANDRE
BY
Karl F. Ross
AGENT

Patented Sept. 23, 1952

2,611,792

UNITED STATES PATENT OFFICE 2,611,792

METHOD OF MAKING ELECTRIC ACCUMULATORS

Henri G. André, Montmorency, France, assignor to Yardney International Corp., a corporation of New York Application April 26, 1950, Serial No. 158,165
In France April 29, 1949

2 Claims. (Cl. 136—6)

This invention relates to electro-chemical generators or accumulators, and more particularly to such accumulators of cylindrical form. In a wide number of electrical devices, it is desirable to use an electric battery of cylindrical form. This is the case, among various other devices, with such appliances as hearing aids, flashlights, etc. The battery cells used heretofore for such purposes were very quickly exhausted, sometimes requiring replacement after as little as one day's useful performance.

It is an object of this invention to provide a reversible electro-chemical energy generator or accumulator of cylindrical form capable of replacing the currently used cylindrical battery cells in various devices wherein such dry cells are exclusively employed at present.

It is another object to provide a cylindrical accumulator which can be quickly removed and put back into place in an appliance.

A further object is to provide a cylindrical accumulator which can be readily connected to a rectifier or charger for recharging purposes.

A further object is to provide a cylindrical accumulator which is extremely lightweight and possesses a considerable output power capacity.

Another object is to provide a cylindrical accumulator which is simple of construction.

Another object is to provide a cylindrical accumulator having a very long useful life, i. e. capable of sustaining a large number of operating (discharging and charging) cycles.

It is also an object to provide a cylindrical accumulator which is capable, if called upon to do so, to yield a very high current, and capable of so doing without deterioration.

An accumulator according to my present invention is formed by placing a positive electrode, comprising an active material more electropositive than zinc, inside a rigid, cylindrical casing substantially concentrically with and spaced from the wall thereof, forming a tubular zinc liner with a longitudinal slit extending over the entire length of the liner, placing the liner inside the casing adjacent its wall, inserting a tubular separator of a material swellable in an alkaline electrolyte between the liner and the positive electrode, and introducing sufficient alkaline electrolyte into the casing to cause the separator to swell and to apply the liner under pressure against the casing wall. Preferably, the separator is first introduced into the casing to divide its interior into an inner, cylindrical and an outer, annular compartment, whereupon the active electropositive material is placed in comminuted form inside the inner compartment and is compacted therein, the zinc liner being thereafter inserted into the outer compartment.

The invention is particularly applicable to the construction of an accumulator in which one electrode is made of silver or nickel, while the other electrode comprises zinc or iron, or cadmium or iron-cadmium, the reactions occurring in the electrodes essentially consisting of oxidations and reductions, with an alkaline electrolyte adapted to retain substantially a constant composition throughout the accumulator's operation.

Figure 3:
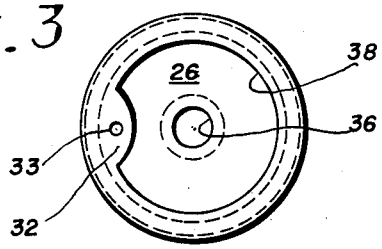
Figure 2:
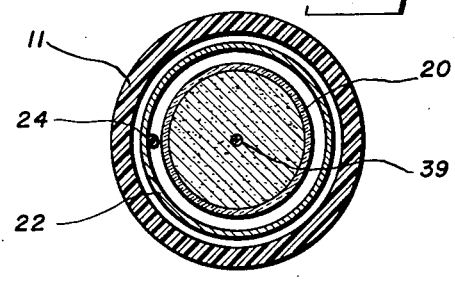
Figure 4:
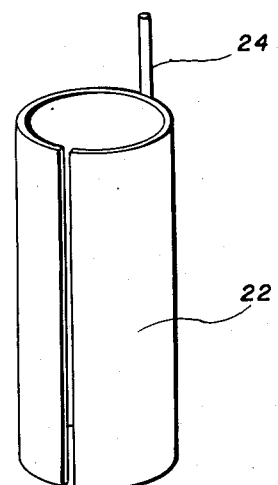

One preferred embodiment of my invention will now be described by way of example, with reference to the accompanying drawing in which:

Fig. 1 is a view in axial section;
Fig. 2 is a section on line 2—2 of Fig. 1;
Fig. 3 is a front view of the plug member; and
Fig. 4 is a perspective view of the negative electrode.

The embodiment of a cylindrical accumulator illustrated comprises a cylindrical receptacle or tank 10 made of a suitable insulating material such as polystyrol or the like. This receptacle comprises a cylindrical side wall 11 formed at its base with a shoulder 12 adjacent to the bottom wall 13, and a bottom appendage or projection 14 axially formed with a small-diameter bore 15. Against the bottom wall 13 is applied a cup member 16 made of ebonite, hard rubber, or similar material, the bottom 17 of which is formed with a central hole 18. The cup member is slightly smaller in external diameter than the thickest part of the side wall 19. In the gap thus defined between the cup 16 and the thickened portion 19 of the side wall there is tightly inserted a cylindrical tube 20 made of regenerated cellulose, and comprising for example a sheet of cellophane or the like rolled into a cylindrical shape.

This tube of cellophane which extends over the major part of the vertical length of the tank 11, say over about three fourths of said length as shown, defines a cylindrical inner chamber 21 in which a body of divided material adapted to form an electrode, such as silver powder, is tightly tamped, said powder being inserted through the wide open unobstructed mouth aperture of the tank 11 on the opposite end thereof from the projection 14. For this filling step, the tank 11 is so arranged that the projection 14 is directed downwards as shown in Fig. 1.

In the annular space defined between the side wall 11 of the tank and the regenerated-cellulose tube 20, a cylindrical negative electrode is inserted, formed for instance, as shown, by a zinc foil liner member 22, one end being substantially flush with the top end of the tube 20.

The amount of powder inserted into the chamber 21 is such that, taking into consideration the tamping of the powder, said powder will not fill the chamber 21 to capacity. In the free space thus provided an absorbent plug 22' is inserted, comprising for example a band or strip of blotting paper formed into a roll, said plug being inserted through the mouth of the tube 20 in such a way as to fit under some slight pressure into the chamber.

Over this tube and the liner 22 there is then placed a disc 23 made of presspahn or similar material substantially equal in diameter to the inner diameter of the tank 11, said disc being thus seated against the circumferential edge of the tube 20 and against the circumferential edge of the liner 22.

Between said disc and the tank there is passed a small-gauge conductor wire 24 bonded to the zinc liner 22, so as to be in good electrical contact with it over a substantial portion of its area.

Against the disc 23 is seated the end surface 25 of an annular plug 26 having a cylindrical body 27 inserted at soft friction fit into the tank 11. The top of the wall of the tank 11 is thinned out owing to an external offset or shoulder 28 and an internal offset 29. With this thinner portion 30 there cooperates the head 31 of the plug 26 which accordingly is larger in external diameter than the body 27. The annular head 31 is provided with a thicker portion 32 in the form of a lune formed with a duct or bore 33 through which is threaded the conductor wire 24, said wire being, throughout its portion not in contact with the liner 22, insulated as with a coat of varnish.

An inner cap 34 cooperates with the top 30 and an outer cap 35 overlies the inner cap 34 to complete the closure of the tank. The outer cap 35 or cover is removable, while the inner cap 34 is permanently attached. To the inner cap 34 the conductor 24 is soldered or welded. Both caps are electrically conductive.

Before placing the outer cap, the electrolyte is first introduced into the tank through the duct 36 formed in the plug 26 and the aperture 34' in the inner cap. The electrolyte is an alkaline solution which may, depending on the formation of the particular accumulator, comprise either an aqueous solution of potassium hydroxide or an aqueous solution of potassium zincate. After the electrolyte has been introduced, the hole 36 is covered with the absorbent plug 37 made of blotting paper or the like, inserted in the recess 38 formed in the plug 26, which may be formed with a central aperture. Under the action of the electrolyte, the cellulose constituting the tube 20 swells and thus becomes applied under pressure both against the silver powder inside the inner chamber 21 and against the roll of zinc foil constituting the liner 22 which is thus pressed against the wall 11 of casing 10.

Into the silver powder there is inserted a conductive silver wire 39 extending substantially axially of the chamber 21, said wire extending through the duct 15 in the boss 14 and being secured to said boss with a spot of tin solder 40. An eyelet 41 or the like preferably surrounds the boss 14.

In an initial formative phase, the element constructed as just described is subjected to a succession of charging and discharging steps effective to convert the solid substance constituting the negative electrode into a finely divided material comprising spongy zinc hydroxide and/or spongy zinc.

The tight seal provided at the lower end of the tube 20 by the clamping action of the resilient cup 16 and the tank wall 19 prevents any migration of the divided material contained inside the tube 20 out of the chamber 21.

The seal at the top mouth opening of said chamber, while preventing migration of the active material out of the chamber, allows evolution of the gases generated during the charging steps.

In one specific construction which has yielded good results in practice, the original zinc foil was formed into a cylinder 2.9 cm. in length and 1.2 cm. in diameter; the inner chamber contained 4 grams of silver powder. The tube 20 is produced by forming a cellophane sheet element 0.025 mm. thick into a roll having from 6 to 8 turns. Such a cell possesses a power capacity of 0.5 amp./hr. It performed up to a hundred operating cycles without any reduction in its useful characteristics.

If necessary, at the end of a certain time of use, the outer cap 35 may be removed and a few drops of make-up water may be added into the cell through the hole 34' in the inner cap 34 through the duct 36.

I claim:

1. The method of making an electric battery which comprises the steps of placing a positive electrode containing an active material more electropositive than zinc inside a rigid, cylindrical casing substantially concentrically with and spaced from the wall of said casing, forming a tubular zinc liner with a longitudinal slit extending over the entire length of the liner, placing said liner inside the casing adjacent said wall, inserting a tubular separator of a material swellable in an alkaline electrolyte between the liner and said positive electrode, and introducing sufficient alkaline electrolyte into the casing to cause said separator to swell and to apply said liner under pressure against said wall.

2. The method of making an electric battery which comprises the steps of introducing into a rigid cylindrical casing a tubular separator, of a material swellable in an alkaline electrolyte, in substantially concentric, spaced relation to the wall of said casing, thereby dividing the interior of said casing into an inner, cylindrical and an outer, annular compartment, placing comminuted electrode material more electropositive than zinc inside said inner compartment, compacting said comminuted material, forming a tubular zinc liner with a longitudinal slit extending over the entire length of the liner, placing said liner inside said outer compartment, and introducing sufficient alkaline electrolyte into the casing to cause said separator to swell and to apply said liner under pressure against said wall.

HENRI G. ANDRÉ.

REFERENCES CITED

The following references are of record in the file of this patent:

UNITED STATES PATENTS

| Number | Name | Date |
|---|---|---|
| 293,563 | Clarke et al. | Feb. 12, 1884 |
| 725,067 | Gardiner et al. | Apr. 14, 1903 |
| 1,481,226 | Rhodes | Jan. 15, 1924 |
| 1,774,037 | Owens | Aug. 26, 1930 |
| 2,176,173 | Fuller et al. | Oct. 17, 1939 |
| 2,317,711 | André | Apr. 27, 1943 |